(12) United States Patent
Rostrup-Nielsen et al.

(10) Patent No.: US 7,481,859 B2
(45) Date of Patent: Jan. 27, 2009

(54) PROCESS FOR COOLING AN EXOTHERMIC REACTION ZONE AND REACTOR UNIT

(75) Inventors: Thomas Rostrup-Nielsen, Holte (DK); John Bøgild Hansen, Copenhagen Ø (DK)

(73) Assignee: Haldor Topsoe A/S, Lyngby (DK)

( * ) Notice: Subject to any disclaimer, the term of this patent is extended or adjusted under 35 U.S.C. 154(b) by 423 days.

(21) Appl. No.: 11/067,563

(22) Filed: Feb. 28, 2005

(65) Prior Publication Data

US 2005/0188619 A1    Sep. 1, 2005

(30) Foreign Application Priority Data

Mar. 1, 2004    (DK)  ................................ 2004 00347

(51) Int. Cl.
    *C10J 3/46*      (2006.01)
    *B01J 8/04*      (2006.01)
    *F28D 7/00*      (2006.01)

(52) U.S. Cl. ................. 48/197 R; 48/198.3; 48/198.7; 422/188; 422/196; 422/200

(58) Field of Classification Search ................ 48/198.1, 48/198.7, 204, 206, 207, 197 FM, 197 R, 48/198.3; 422/168, 179, 182, 188, 196, 198, 422/200, 207; 208/15, 106, 108, 113
See application file for complete search history.

(56) References Cited

U.S. PATENT DOCUMENTS

| | | | |
|---|---|---|---|
| 2,850,360 A | | 9/1958 | Bottenberg |
| 3,666,682 A | * | 5/1972 | Muenger ..................... 252/373 |
| 3,909,299 A | * | 9/1975 | Corrigan ..................... 422/190 |
| 4,522,894 A | * | 6/1985 | Hwang et al. ................. 429/17 |
| 5,181,937 A | * | 1/1993 | Karafian et al. ................. 48/95 |
| 5,484,577 A | * | 1/1996 | Buswell et al. ............... 422/211 |
| 6,103,143 A | * | 8/2000 | Sircar et al. .................. 252/373 |
| 6,315,973 B1 | * | 11/2001 | Nataraj et al. ............ 423/418.2 |
| 6,375,924 B1 | * | 4/2002 | Towler et al. ................ 423/656 |
| 6,402,988 B1 | * | 6/2002 | Gottzmann et al. .......... 252/373 |
| 6,623,719 B2 | * | 9/2003 | Lomax et al. ................ 423/652 |
| 6,805,721 B2 | * | 10/2004 | Burch et al. ................ 48/198.3 |
| 6,869,578 B1 | * | 3/2005 | Hebert et al. ................ 422/198 |
| 7,182,921 B2 | * | 2/2007 | Miura et al. ................. 422/187 |
| 7,184,847 B2 | * | 2/2007 | Sun et al. ....................... 700/42 |

(Continued)

FOREIGN PATENT DOCUMENTS

DE      33 18 098      11/1984

(Continued)

*Primary Examiner*—Walter D Griffin
*Assistant Examiner*—Huy-Tram Nguyen
(74) *Attorney, Agent, or Firm*—Dickstein Shapiro LLP

(57) ABSTRACT

Process for cooling an exothermic reaction zone by
introducing a stream of water and a hydrocarbon-containing stream into a plurality of humidifying tubes extending through a catalytic exothermic reaction zone of a catalytic fixed bed with solid catalyst,
introducing a process stream into the reaction zone for one or more catalytic exothermic reactions,
passing the stream of water in a falling film along the inner circumference of the humidifying tubes,
humidifying the hydrocarbon-containing stream with water in the humidifying tubes in indirect heat exchange with the exothermic reaction zone,
withdrawing cooled reaction product of the exothermic reaction from the reaction zone,
withdrawing the heated humidified, hydrocarbon-containing stream from the humidifying tubes, and
transferring the heated humidified, hydrocarbon-containing process stream for further processing.

7 Claims, 3 Drawing Sheets

U.S. PATENT DOCUMENTS

| | | | |
|---|---|---|---|
| 7,252,693 B2 * | 8/2007 | Rostrup-Nielsen et al. | 48/197 R |
| 2002/0062943 A1 * | 5/2002 | Kondo et al. | 165/4 |
| 2002/0131922 A1 | 9/2002 | Sakai | |
| 2003/0136051 A1 * | 7/2003 | Sevenhuijsen et al. | 48/127.9 |
| 2003/0138373 A1 * | 7/2003 | Graham et al. | 423/650 |
| 2003/0223925 A1 | 12/2003 | Rostrup-Nielsen et al. | |
| 2005/0204629 A1 * | 9/2005 | Gittleman et al. | 48/197 R |
| 2006/0188434 A1 * | 8/2006 | Mahlendorf et al. | 423/652 |

FOREIGN PATENT DOCUMENTS

| | | |
|---|---|---|
| DE | 41 20 788 | 1/1993 |
| EP | 0985 635 | 3/2000 |
| EP | 985635 A1 * | 3/2000 |
| EP | 1 364 910 | 11/2003 |
| EP | 1364910 A1 * | 11/2003 |
| GB | 279 819 | 2/1929 |
| WO | WO 88/06054 | 9/1988 |
| WO | WO 02/085781 | 10/2002 |

\* cited by examiner

PROCESS FOR COOLING AN EXOTHERMIC REACTION ZONE AND REACTOR UNIT

The present invention is directed to a process and a reactor unit for cooling an exothermic reaction zone. In particular, the process is useful for cooling an exothermic reaction zone with reactions such as the water gas shift reaction and/or preferential carbon monoxide oxidation reaction.

The water gas shift, steam and autothermal reforming reactions are given in equations 1-3:

$$CO + H_2O \Leftrightarrow CO_2 + H_2 \quad (1)$$

$$CH_4 + H_2O \Leftrightarrow CO + 3H_2 \quad (2)$$

$$CH_4 + \tfrac{1}{2}O_2 \Rightarrow CO + 2H_2 \quad (3)$$

The water gas shift reaction (abbreviated to the shift reaction) shown in reaction (1) is an exothermic equilibrium reaction and lower temperatures increase the conversion to hydrogen provided the gas is contacted with a shift catalyst that is sufficiently active. The steam reforming reaction (2) is an endothermic equilibrium reaction and therefore requires heat to increase the conversion of the hydrocarbon (here exemplified by methane) to hydrogen. Control of the reaction temperatures is therefore an important factor for obtaining maximum conversion of the hydrocarbon and carbon monoxide to hydrogen. In autothermal reforming, combustion of hydrocarbon feed is carried out with substoichiometric amounts of oxygen by flame reactions in a burner combustion zone as given in the exothermic reaction (3).

Other relevant reactions are the exothermic preferential oxidation (Prox) reaction of carbon monoxide with oxygen and the competing oxidation reaction of hydrogen to water:

$$CO + \tfrac{1}{2}O_2 \rightarrow CO_2 + H_2O \quad (4)$$

$$H_2 + \tfrac{1}{2}O_2 \rightarrow H_2O \quad (5)$$

Reaction (5) consumes the often desirable product hydrogen, while it competes with reaction (4) for the oxygen available and it is therefore an undesirable reaction.

U.S. Pat. No. 6,375,924 discloses a shift process, whereby temperature control is partly obtained by spray cooling the reacting gases with water. The effluent gases from a reformer are spray cooled in a first spray cooling zone to provide an effluent water admixture, prior to entering the high temperature shift zone of the reactor. The high temperature shift effluent is passed to a second water spray cooling zone before entering a low temperature shift zone in the reactor to produce a water saturated hydrogen product stream.

EP patent application No. 0985,635 discloses a hydrogen generating apparatus comprising a reformer and a shift reactor. Water is vapourised in a first vapouriser and the hydrocarbon feed to the reformer is fed into the first vapouriser, where the feed is mixed with steam. This mixture is passed to the reformer. The reformed gas is fed to a second vapouriser, where it is mixed with water which has been vapourised to steam. This mixture is fed to the shift reactor. Controlling the amount of water vapourised leads to control of the catalyst temperatures.

U.S. patent application No. 20030223925, incorporated herein by reference, discloses an isothermal shift process whereby a carbon monoxide containing feed gas is introduced into a shift reactor, where the shift reaction is performed at substantially isothermal conditions through cooling of the reactor tubes with a liquid cooling agent followed by passing the formed hydrogen through a hydrogen selective membrane to a permeate zone. The shift reaction can be cooled by boiling water in a falling film reactor, the falling film serving to humidify dry feed gas before the shift reaction takes place.

U.S. Pat. No. 2,850,360 discloses an apparatus for cooling an exothermic reaction by indirect heat exchange. The apparatus comprises a tube-bundle and shell type heat exchanger. Gaseous olefin is reacted with sulphuric acid in an exothermic reaction in the tubes. The resulting product is mixed with water and the partially hydrolysed product is transferred to the shell side of the reactor in indirect heat exchange with the reactants.

It is an object of this invention to provide an improved process for cooling an exothermic reaction such as the shift reaction and/or the preferential oxidation reaction of carbon monoxide.

It is also an objective of the invention to provide a process and a reactor unit useful as a fuel processing system for fuel cells.

SUMMARY OF THE INVENTION

In accordance with the above, the invention concerns a process for cooling an exothermic reaction zone by introducing a stream of water and a hydrocarbon-containing stream into a plurality of humidifying tubes extending through a catalytic exothermic reaction zone of a catalytic fixed bed with solid catalyst, introducing a process stream into the reaction zone for one or more catalytic exothermic reactions, passing the stream of water in a falling film along the inner circumference of the humidifying tubes, humidifying the hydrocarbon-containing stream with water in the humidifying tubes in indirect heat exchange with the exothermic reaction zone, withdrawing cooled reaction product of the exothermic reaction from the reaction zone, withdrawing the heated humidified, hydrocarbon-containing stream from the humidifying tubes, and transferring the heated humidified, hydrocarbon-containing process stream for further processing.

The invention also concerns a reactor unit for carrying out the cooling process comprising within a reactor shell a catalytic exothermic reaction zone, the reactor having an inlet for a hydrocarbon-containing stream and an inlet for a stream of water, each inlet placed upstream the catalytic exothermic reaction zone, the catalytic exothermic reaction zone having an inlet for a process stream and an outlet for the process stream reaction product, and comprising a catalytic fixed bed with solid catalyst and a plurality of humidifying tubes for humidifying the hydrocarbon-containing stream, the humidifying tubes extending throughout the exothermic reaction zone, the humidifying tubes being open at either end and adapted to create a falling film of water along their inner circumference in order to exchange heat by indirect heat contact with the reaction zone, the reactor having an outlet downstream the reaction zone.

In the process of the invention a hydrocarbon-containing stream and a stream of water enter a reactor with a catalytic reaction zone and the two streams pass downwards through a number of tubes where the hydrocarbon-containing stream is humidified with water. These tubes extend through the catalytic reaction zone having an exothermic reaction zone providing heat for the humidifying process by heat exchange. The cooled reaction product of the exothermic reaction is withdrawn from the reaction zone for further processing or collection and the heated, humidified hydrocarbon-containing process stream is also transferred for further processing.

DETAILED DESCRIPTION OF THE INVENTION

Figure 1:
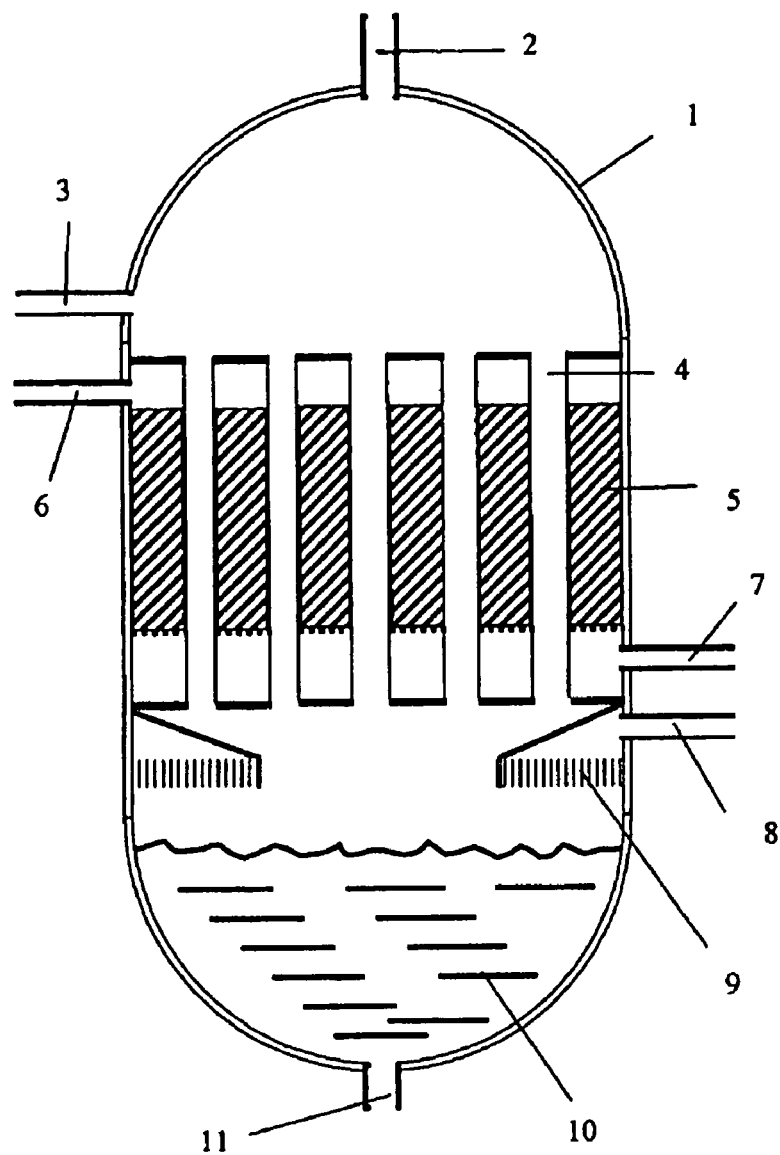
FIG. 1 is a schematic diagram illustrating the reactor unit with the exothermic reaction zone.

Some processing plants having both a steam reformer and a shift reactor can export steam as a by-product. Often there is a requirement to the quality of the steam exported. The steam is generated by evaporation of process condensate, which is unreacted process steam not used by reactions (1) and (2) together with make-up water. Due to the normal occurrence of by-products in the process condensate it is often necessary to invest in a process condensate stripper for separating the by-products from the steam together with a feed/effluent heat exchanger and a pump.

The steam is typically generated by a system of water preheaters, waste heat boilers and a steam drum. Make-up water and process condensate is preheated before being sent to the steam drum. Water from the steam drum passes through waste heat boilers and returns to the steam drum partially vaporised. The steam separates from the water and leaves the steam drum.

The process and the apparatus of the invention combine many of the unit operations of the plant described above, reducing the investment cost and improving the process economics.

The process of the invention will be illustrated in detail with reference to FIG. 1. A hydrocarbon-containing stream and a stream of water enter the reactor 1 through their respective inlets 2 and 3. The hydrocarbon-containing stream contains for instance natural gas (primarily methane) or higher hydrocarbons. Higher hydrocarbons are defined as being hydrocarbons higher than methane i.e. $C_{2+}$. The hydrocarbon-containing stream can be desulphurised by subjecting it to a hydrodesulphurisation step before it enters reactor 1.

The two streams enter a number of humidifying tubes 4 extending through an exothermic reaction zone. The stream of water is passed in a falling film along the inner circumference of the humidifying tubes 4. As the mixture passes down the humidifying tubes 4, water is evaporated and the steam formed thereby humidifies the hydrocarbon-containing stream. The heat for this evaporation is provided by the exothermic reaction occurring in the reaction zone 5 outside the tubes 4 and the exothermic reaction zone is simultaneously cooled. If required, the hydrocarbon-containing stream can be completely saturated with steam.

The reaction zone 5 can be a catalytic fixed bed with solid catalyst. The solid catalyst comprises catalyst pellets, catalysed hardware in the form of structured elements with a catalytic layer of for instance shift catalyst and/or a catalytic layer coated directly on the outside of the tubes. Structured elements cover catalyst systems where a layer of catalyst is fixed on a surface of another material, the other material serving as a supporting structure giving strength to the system. The other material can be metallic or ceramic. Examples are monoliths, cross-corrugated structures, high surface area structured elements, foams, plates, structures attached to the tube wall or other suitable shapes.

A catalyst for catalysing a chemical reaction in which heat is released is used in reaction zone 5. This chemical reaction could, for example, be the exothermic water gas shift reaction given in equation (1) where the appropriate shift catalyst is applied. Other suitable exothermic reactions applicable in the process of the invention are the methanol synthesis reaction and the formaldehyde synthesis reaction both of which are exothermic reactions. A further reaction applicable in the process of the invention is the exothermic preferential oxidation reaction of carbon monoxide, reaction (4).

A process stream enters the reaction zone 5 through the inlet 6. This process stream could for example be a reformed gas that has to be subjected to further shift reaction in the reaction zone 5. The exothermic reaction is cooled by utilising the generated heat for evaporation of water in the humidifying tubes 4. After ended reaction the product stream from the reaction zone 5 leaves the reactor through outlet 7.

After the hydrocarbon-containing stream has been humidified, it leaves the humidifying tubes 4 and subsequently reactor 1 through outlet 8. If necessary the humidified hydrocarbon-containing stream can be passed through a de-mister 9 for coalescing any water droplets present in the stream before leaving the reactor 1. After leaving the reactor 1, the humidified hydrocarbon-containing stream is then transferred for further processing.

The humidified hydrocarbon-containing stream can be further processed by subjecting it to an adiabatic or non-adiabatic steam reforming reaction and/or autothermal reforming reaction or non-catalytic gasification.

In the case where the humidified hydrocarbon-containing stream is reformed, the reforming zone can be an endothermic or exothermic reforming zone, for example a steam reforming zone or an autothermal reforming zone. If the hydrocarbon-containing stream includes higher hydrocarbons, the reforming zone can be a prereforming zone where the higher hydrocarbons are irreversibly converted to methane, carbon monoxide and carbon dioxide. The prereforming step can then be followed by, for instance, a steam reforming step.

In an embodiment of the invention, any water remaining after humidification of the hydrocarbon-containing stream leaves the humidifying tubes 4 and falls into a water reservoir 10 at the bottom of the reactor 1. The water reservoir 10 acts as a steam drum and it can be connected to a waste heat boiler. The waste heat boiler can for instance be a flue gas boiler (shown in FIG. 3, reference numeral 12) or it can be operated as a kettle boiler. Steam generated by the boiler can join the humidified hydrocarbon-containing stream. The bottom of the water reservoir of reactor 1 has an outlet 11 for withdrawal of water and if necessary recycling of water to inlet 3.

The embodiment described above and illustrated in FIG. 1 has the advantage of replacing the following in a conventional process: the shift reactor, waste heat boiler(s), the process condensate stripper, the feed/effluent exchanger and a substantial amount of connecting piping and structural steel. In addition the remaining steam drum and associated steam system is greatly reduced in size. In an embodiment of the invention the exothermic reaction zone 5 is divided into two zones: a zone provided with high temperature (HT) shift catalyst and a zone provided with low temperature (LT) shift catalyst, the LT catalyst placed downstream the HT catalyst.

In yet an embodiment of the invention with reference to FIG. 1, the exothermic reaction zone 5 is divided into a shift catalyst zone and a Prox catalyst zone downstream the shift catalyst zone. An oxygen containing stream is provided to the Prox catalyst zone. In one embodiment the reaction zone is divided into three catalyst zones provided with respectively a HT shift catalyst, a LT shift catalyst downstream the HT catalyst and a Prox catalyst downstream the LT shift catalyst. This is advantageous because the temperature of the effluent from the LT shift corresponds to the temperature required at the inlet to the Prox section and the cooling provided by humidifying the hydrocarbon ensures optimum selectivity for reaction (4) versus reaction (5). The effluent leaving the Prox section downstream the LT shift catalyst through outlet 7 of reaction zone 5 can be directed to a fuel cell, the effluent providing hydrogen for the anode reaction. Air or oxygen is provided from another source for the cathode reaction.

Figure 2:
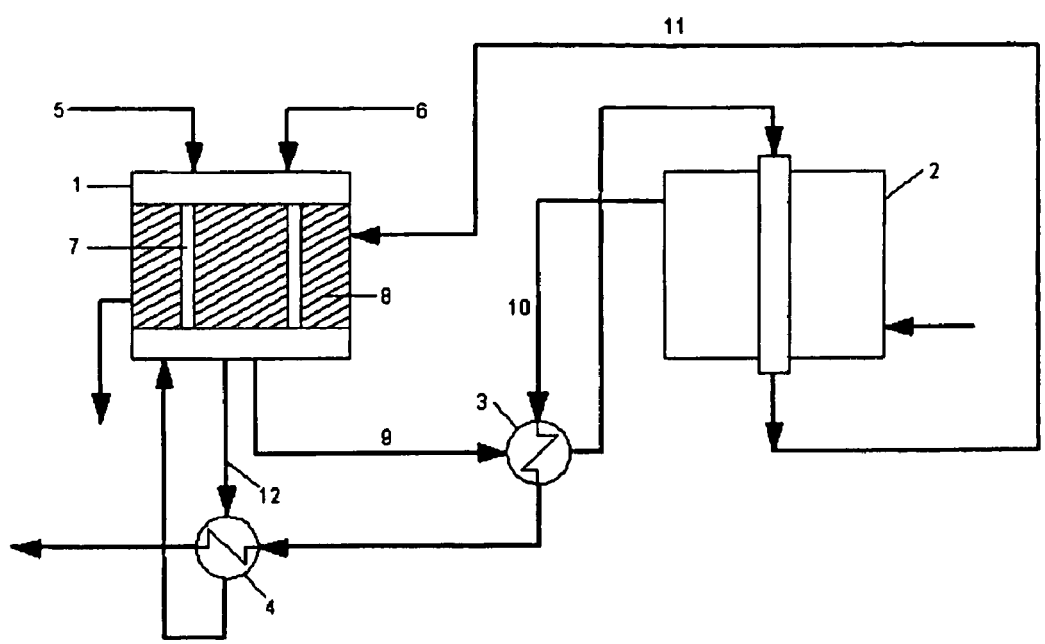
FIG. 2 is a flow diagram illustrating the reactor unit with the exothermic reaction zone in series with a reactor having an endothermic reaction zone.

FIG. 2 illustrates an embodiment of the invention, where the exothermic reaction zone is in series with an endothermic reaction zone, which can be a reforming zone where a hydrocarbon such as methane is reformed according to equation (2). A hydrocarbon-containing stream 5 and a stream of water 6 enter the reactor 1. The two streams enter a number of humidifying tubes 7 extending through the exothermic reaction zone 8. As the hydrocarbon steam mixture passes down the humidifying tubes 7, water is evaporated and the steam formed thereby humidifies the hydrocarbon-containing stream as explained earlier in the description of FIG. 1.

The humidified hydrocarbon-containing stream 9 leaves the reactor 1 having the exothermic reaction zone 8 and enters a reforming reaction zone. In this example the reforming zone is endothermic and the reformer is illustrated by using a fired, tubular reformer 2. A convective reformer can also be used instead of a tubular reformer. The humidified hydrocarbon-containing stream 9 can be optionally heat exchanged in heat exchanger 3 with flue gas 10 from the tubular reformer 2 before reforming. In the tubular reformer 2 methane is reformed to produce carbon monoxide and hydrogen and these products 11 are then shifted by transferring them to the reaction zone 8 of reactor 1.

Water 12 can optionally be withdrawn from the water reservoir of reactor 1 and further heat exchanged 4 with the flue gas 10 from the tubular reformer 2. The flue gas 10 can therefore undergo two heat exchange steps, where the first step is heat exchange 3 with the humidified hydrocarbon-containing stream 9 and the second step is heat exchange 4 with water 12. The heat content of the flue gas 10 can in addition be used for other purposes e.g. heating of the hydrocarbon-containing stream prior to desulphurisation.

In a further embodiment of the invention the exothermic reaction zone is in series with an exothermic autothermal reforming zone, where the hydrocarbon compound is oxidised according to equation (3). The humidified hydrocarbon-containing stream leaves the reactor 1 having the exothermic reaction zone and enters an autothermal reformer. The humidified hydrocarbon-containing stream can optionally be heated by a heat source to obtain the required inlet temperature to the autothermal reformer prior to entering the reformer. Optionally the stream can be prereformed and optionally reheated prior to entering the autothermal reformer. An additional stream with oxidising compound also enters the autothermal reformer. This oxidising compound is usually air or oxygen. The reformed effluent leaving the autothermal reformer is then transferred to the exothermic reaction zone 8 in reactor 1. During its transfer to reaction zone 8 it can be cooled using a waste heat boiler, if required. The water reservoir in reactor 1 can be used as a steam drum. Water can optionally be withdrawn from the water reservoir of reactor 1 and further heated by process flue gas, which in turn is then cooled.

Figure 3:
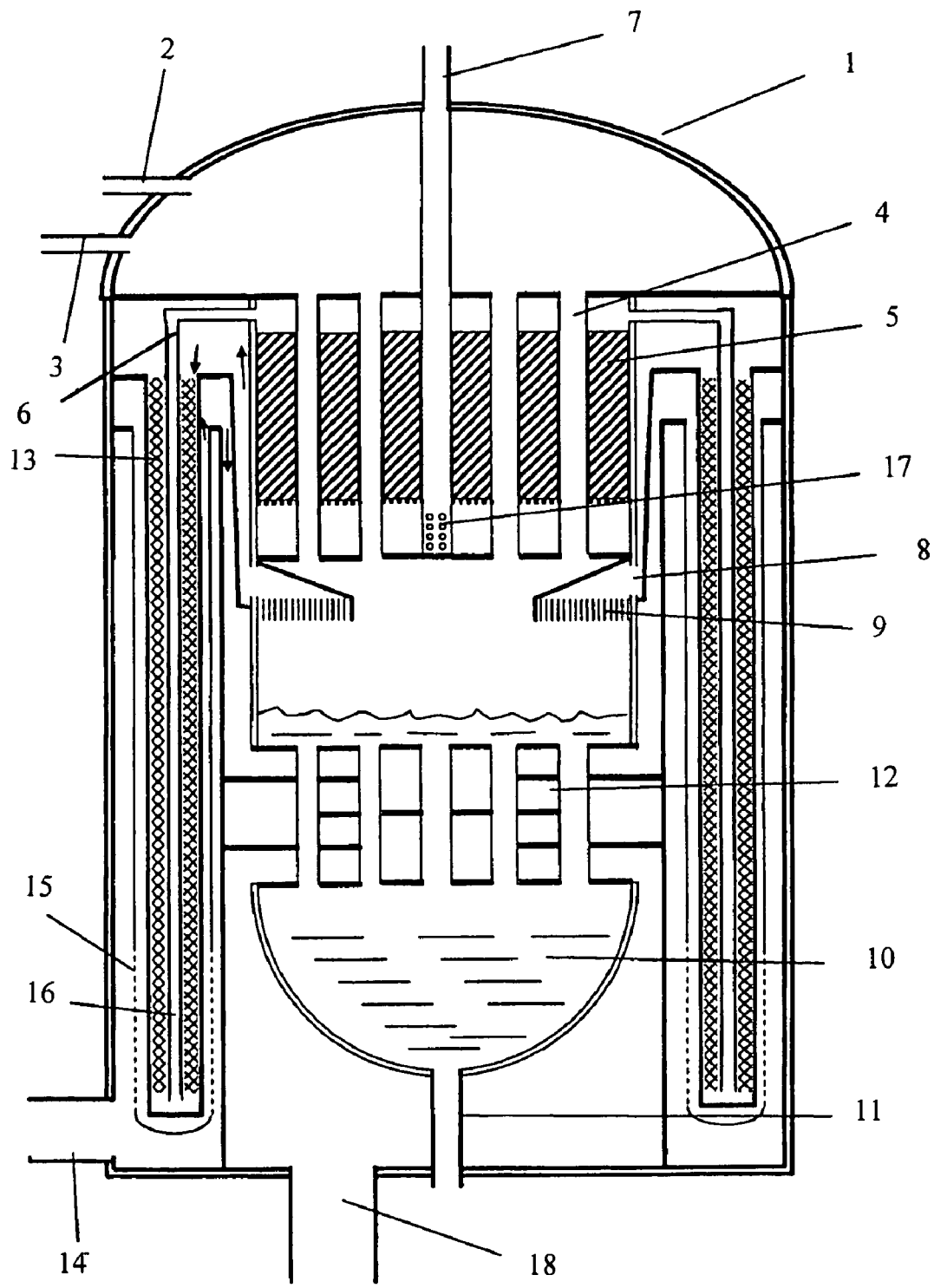
FIG. 3 is a schematic diagram illustrating the reactor unit with the exothermic reaction zone integrated with a reactor having an endothermic reaction zone.

FIG. 3 illustrates a further embodiment of the invention where the reactor 1 with the exothermic reaction zone is integrated with a reactor having an endothermic reaction zone. For convenience the reference numerals used in FIG. 1 are also applicable in FIG. 3. The humidified hydrocarbon-containing stream leaves the reactor 1 through outlet 8 and enters the endothermic reaction zone, which could be a reforming zone. In this case the reforming zone is illustrated by using convective reformer tubes 13 such as the type known as HTCR from Haldor Topsøe A/S.

Heat is supplied to the reforming tubes 13 by flue gas from a combustion chamber. The reforming tubes are heated by heat exchange with flue gas entering through inlet 14 and flowing upwards along the shell side of the tubes in a sleeve 15 surrounding the reforming tubes 13. After leaving the sleeve 15 the flue gas flows down between the shift section and the reforming tubes 13 counter current to the humidified hydrocarbon-containing stream being transferred to the reforming tubes 13. Part of the heat content of the flue gas is used to heat this stream. Subsequently, the flue gas enters the flue gas waste heat boiler 12, before leaving the integrated reactor through outlet 18.

The humidified hydrocarbon-containing stream leaves the humidification section through outlet 8 and travels upwards towards the inlet of the reforming tubes while heat exchanging with the flue gas flowing down. Thereby the humidified hydrocarbon-containing stream reaches the inlet temperature to the reforming tubes 13. The heated stream enters the reforming tubes 13 where it is reformed. The reformed effluent enters the bayonet tube 16 at the bottom of the reforming tube. The bayonet tubes 16 are connected radially to the shift section with the reaction zone 5.

The reformed effluent thereafter enters the reaction zone 5 where it is shifted to hydrogen and carbon dioxide according to equation (1). It is also simultaneously cooled by heat removal due to the evaporation of water taking place inside the humidifying tubes 4 as described earlier. The effluent product stream is then withdrawn from the reaction zone through the outlet 7 for further processing or collection. The outlet 7 is centrally placed in the reaction zone and is equipped with perforations 17 in its lower region through which the effluent product stream is collected and thereafter channelled out of the reactor 1.

Additional savings in structural steel and piping are also obtained with the integrated reactor unit shown in FIG. 3. In the reactor unit of the invention heat is integrated in such a way that it does not export steam, and the unit therefore replaces the shift reactor, waste heat boiler(s) and the steam drum and associated steam system is totally eliminated.

Another advantage of the inventive process is the lower equilibrium temperature of the shift reaction obtained. The equilibrium temperature is lowered from about 450° C., the operating temperature in a high temperature shift reactor, or from about 330° C., the operating temperature in a medium temperature shift reactor, to about 225° C. The lower equilibrium temperature results in a greater yield of hydrogen as reaction (1) favours hydrogen production at low temperatures. Thus the process and apparatus of the invention increases the hydrogen production from a plant with a given steam reformer or autothermal reformer. This reduces the necessary investment for a given production and thus improves the process economics.

Another advantage of the process and reactor unit of the invention is their use in small-scale hydrogen generation. This is particularly useful for small-scale residential or commercial applications where compactness and a combined heat and power unit is required. The embodiments described earlier are particularly suitable in fuel processing systems for proton exchange membrane fuel cells.

The invention claimed is:

1. Process for cooling an exothermic reaction zone, the process comprising the steps of:
    introducing a stream of water and a hydrocarbon-containing stream into a plurality of humidifying tubes extending through a catalytic exothermic reaction zone of a catalytic fixed bed with solid catalyst;
    introducing a process stream into the reaction zone for one or more catalytic exothermic reactions;
    passing the stream of water in a falling film along the inner circumference of the humidifying tubes;
    humidifying the hydrocarbon-containing stream with water in the humidifying tubes in indirect heat exchange with the exothermic reaction zone;
    withdrawing cooled reaction product of the exothermic reaction from the exothermic reaction zone;
    withdrawing the heated humidified, hydrocarbon-containing stream from the humidifying tubes; and
    introducing the heated humidified, hydrocarbon-containing stream into an endothermic steam reforming zone.

2. A process according to claim 1, wherein the hydrocarbon-containing stream is saturated with water or with steam formed in the humidifying tubes during the cooling of the exothermic reaction in the reaction zone.

3. A process according to claim 1, wherein the exothermic reaction is the water gas shift reaction and/or the preferential oxidation reaction of carbon monoxide.

4. A water gas shift process for converting hydrocarbons to hydrogen for use in fuel cells, comprising the steps of:
    providing a reactor unit in communication with a fuel processing system for fuel cells;
    conducting at least one water gas shift reaction for producing hydrogen to be used in the fuel processing system; and
    conducting a process according to claim 1 to cool an exothermic reaction zone of the reactor unit.

5. Reactor unit for carrying out the cooling process of claim 1 comprising within a reactor shell a catalytic exothermic reaction zone, the reactor having an inlet for a hydrocarbon-containing stream and an inlet for a stream of water, each inlet placed upstream the catalytic exothermic reaction zone, the catalytic exothermic reaction zone having an inlet for a process stream and an outlet for the process stream reaction product, and comprising a catalytic fixed bed with solid catalyst and a plurality of humidifying tubes for humidifying the hydrocarbon-containing stream, the humidifying tubes extending throughout the exothermic reaction zone, the humidifying tubes being open at either end and adapted to create a falling film of water along their inner circumference in order to exchange heat by indirect heat contact with the reaction zone, the reactor having an outlet downstream the reaction zone,
    wherein the reactor unit further comprises within the reactor shell a reforming zone having at least one catalytic reforming tube radially connected to the reaction zone, the at least one reforming tube having an inlet for receiving the humidified hydrocarbon-containing stream from the reaction zone, and an outlet for directing the reformed effluent process stream to the inlet of the exothermic reaction zone.

6. Reactor unit according to claim 5, further comprising within the reactor shell a flue gas waste heat boiler downstream the reaction zone, the flue gas boiler having piping means connecting the boiler to the combustion chamber supplying heat to the at least one reforming tube, the piping means being adapted to allow indirect heat exchange of the flue gas with the humidified hydrocarbon-containing stream.

7. Reactor unit according to claim 5 comprising a catalytic exothermic reaction zone provided with water gas shift catalyst and/or catalyst for the preferential oxidation reaction of carbon monoxide.

* * * * *